(12) United States Patent
Belcher et al.

(10) Patent No.: US 8,779,911 B2
(45) Date of Patent: Jul. 15, 2014

(54) VEHICULAR MIRROR WITH BLIND SPOT INDICATOR

(75) Inventors: Simon Belcher, Lonsdale (AU); Christopher Moase, South Brighton (AU)

(73) Assignee: SMR Patents S.a.r.l., Luxembourg (LU)

( * ) Notice: Subject to any disclaimer, the term of this patent is extended or adjusted under 35 U.S.C. 154(b) by 47 days.

(21) Appl. No.: 13/570,599

(22) Filed: Aug. 9, 2012

(65) Prior Publication Data

US 2013/0201012 A1 Aug. 8, 2013

(30) Foreign Application Priority Data

Aug. 10, 2011 (AU) ................................ 2011903207

(51) Int. Cl.
*B60Q 1/00* (2006.01)
*B60R 1/08* (2006.01)

(52) U.S. Cl.
USPC ........ 340/425.5; 340/436; 340/463; 359/862; 359/864

(58) Field of Classification Search
USPC ........... 340/425.5, 433, 468, 472, 475, 815.4, 340/903, 904, 436, 463; 359/245, 265, 267, 359/601, 603, 838, 839, 843, 864, 866, 868, 359/862; 701/96, 301
See application file for complete search history.

(56) References Cited

U.S. PATENT DOCUMENTS

| | | | |
|---|---|---|---|
| 4,306,770 A * | 12/1981 | Marhauer | 359/864 |
| 6,919,796 B2 | 7/2005 | Boddy et al. | |
| 8,169,681 B2 * | 5/2012 | Tonar et al. | 359/245 |
| 8,547,622 B2 * | 10/2013 | Tonar et al. | 359/245 |
| 2002/0041442 A1 * | 4/2002 | Witt | 359/603 |
| 2004/0120056 A1 * | 6/2004 | Goolsby | 359/866 |
| 2005/0047158 A1 | 3/2005 | Koehler | |
| 2005/0174645 A1 | 8/2005 | Boddy et al. | |
| 2006/0056086 A1 | 3/2006 | Hannah | |
| 2006/0250224 A1 * | 11/2006 | Steffel et al. | 340/435 |
| 2009/0174959 A1 | 7/2009 | Sinelli et al. | |
| 2010/0259841 A1 * | 10/2010 | Matsumoto et al. | 359/862 |
| 2011/0128137 A1 | 6/2011 | Varaprasad et al. | |
| 2011/0157732 A1 | 6/2011 | Henion et al. | |
| 2011/0228414 A1 * | 9/2011 | Locatelli et al. | 359/868 |

FOREIGN PATENT DOCUMENTS

EP 2481638 A1 8/2012

OTHER PUBLICATIONS

Australian Patent Examination Report for Australian application No. 2012211407 dated Dec. 12, 2013; 6 pp.

* cited by examiner

*Primary Examiner* — Van T. Trieu
(74) *Attorney, Agent, or Firm* — Reising Ethington PC

(57) ABSTRACT

An exterior rear view mirror assembly (10) for a motor vehicle (1) with a blind spot indicator for visually alerting a driver (5) to the presence of an object (2) in the blind spot (3) of the motor vehicle (1). The mirror assembly (10) includes a first mirror surface (30) and a second mirror surface (32). The mirror assembly (10) further includes a transition surface (34) disposed between the first and second mirror surfaces (30, 32) for displaying a blind spot indicator to the driver (5) when an object (2) is detected in the vehicle's blind spot (3). The transition surface (34) for displaying the blind spot indicator is oriented generally towards the driver of the vehicle and away from other road users. Preferably, the transition surface (34) forms a discrete step or discontinuity between the first and second mirror surfaces (30, 32).

15 Claims, 5 Drawing Sheets

VEHICULAR MIRROR WITH BLIND SPOT INDICATOR

The present application claims priority from Australian Provisional Application No. 2011903207 entitled "Vehicular Mirror with Blind Spot Indicator," and filed on 10 Aug. 2011, the entire content of which is hereby incorporated by reference in its entirety.

BACKGROUND ART

1. Field of the Invention

The invention relates to external rear view mirrors for motor vehicles that allows a driver to observe objects located in a blind spot of the vehicle.

2. Description of the Related Art

The blind spot (or zone) of a motor vehicle is an area around the vehicle that cannot be directly observed by a driver with ease. The blind spots of most significance to a driver of a vehicle are the areas located adjacent to the rear quadrants of the vehicle. Objects in these areas may not be visible to a driver using a conventional rear view mirror (interior or exterior). There is therefore an inherent danger that a blind spot accident may occur when changing lanes or attempting to overtake another vehicle. The simplest solution to prevent an accident of this type occurring is for the driver to physically turn their head and to look directly behind into the blind spot. This is cumbersome and requires the driver to take their eyes off the road in front of them which presents additional dangers.

A solution to the above problem is to increase the field of view of the exterior (side) rear view mirror to enable viewing of the blind spot. A spotter (or blind spot) mirror may be provided to achieve this additional field of view. A spotter mirror is usually a convex mirror that may be fitted as an aftermarket add-on to the exterior rear view mirror. In other forms, it may be a separate mirror component that is mounted into the mirror assembly or it may be formed integrally with the exterior rear view mirror. The spotter mirror has a field of view encompassing the vehicle's blind spot such that objects located in the blind spot become observable to the driver when they view the reflection provided by the spotter mirror.

Although using a spotter mirror alleviates the problem to some extent, often it is desirable to provide the driver with further blind spot indication and to direct their attention towards the spotter mirror. This may be achieved by a blind spot indicator which may take the form of a visual stimulus such as a light or illuminated symbol or alternatively an audio sound. This additional stimulus immediately alerts the driver viewing the exterior mirror that an object is present in the blind zone and prompts them to pay particular attention to the spotter mirror, thereby drawing their attention to an object in the vehicle's blind zone. Alternatively, the driver may notice the indicator in their peripheral vision which will then prompt them to look at the spotter mirror.

A problem with known blind spot indicators, particularly illuminated markers and lighting displays is that they are often located in a region of the actual mirror surface such that when operable they partly reduce or obscure the driver's visible field of view. These blind spot indicators for external rear view mirrors are also visible to other road users which may create a source of distraction or interference.

For example, U.S. Pat. No. 6,919,796 (Boddy et al) discloses an exterior side mirror having a primary reflective mirror, a spotter mirror and a blind spot indicator. The blind spot indicator is located either on the spotter mirror or around the periphery of the spotter mirror. These locations are problematic as the field of view of the spotter mirror is either compromised by the blind spot indicator or in the case of the indicator (signalling light) around the periphery of the spotter mirror; the light would be easily visible to other road users and may become a source of distraction of interference.

An alternative construction is disclosed in US Patent Application No. 2005/0174645 (Boddy et al) in which a spotter mirror is integrally formed with the primary mirror to form an external rear view mirror assembly. A series of lighting elements is inserted around a portion of the circumference of the spotter mirror to draw the driver's attention to the spotter mirror when an object is detected in the blind spot of the vehicle. A blind spot indicator configured in this way would partially obscure the field of view of the spotter mirror and would also be readily viewable by other road users when activated.

An object of the present invention is to ameliorate one or more of the above described difficulties or at least provide a useful alternative to arrangements of the type discussed above.

Other advantages of the present invention will become apparent from the following description, taken in connection with the accompanying drawings, wherein, by way of illustration and example, a preferred embodiment of the present invention is disclosed.

SUMMARY OF THE INVENTION

According to a first aspect of the invention there is provided an exterior rear view mirror assembly for a motor vehicle, the mirror assembly including:

a first mirror surface for providing a rearward field of view to a driver of the vehicle;

a second mirror surface for providing a rearward field of view to the driver of a blind spot of the vehicle;

a transition surface disposed between the first and second mirror surfaces for displaying a blind spot indicator to the driver when an object is detected in the vehicle's blind spot;

wherein, the transition surface for displaying the blind spot indicator is oriented generally towards the driver of the vehicle.

In one form the transition surface has a first edge contiguous with the first mirror surface and a second edge contiguous with the second mirror surface.

In one form the first mirror surface, second mirror surface and transition surface are integrally formed.

In one form the transition surface forms a discrete step or discontinuity between the first and second mirror surfaces.

In one form at least a portion of the transition surface is transparent.

In one form at least a portion of the transition surface is semi-transparent.

In one form the blind spot indicator includes a light source located behind the transition surface.

In one form the light source includes at least one light emitting diode (LED).

In one form the blind spot indicator includes a symbol or indicator displayable on the transition surface, the symbol or indicator illuminated by the light source when an object is detected in the vehicle's blind spot.

In one form the mirror assembly further includes a symbol located on either the first or second mirror surfaces for identifying the indicator displayable on the transition surface as a blind spot indicator.

In one form the first mirror surface has a minimum radius of curvature of 600 mm.

In one form the second mirror surface has a radius of curvature in the range 200-500 mm.

In one form at least one of the first or second mirror surfaces are flat (planar).

In one form the mirror is formed from a plastic polymer. It may be formed from a polycarbonate (PC) or an acrylic (PMMA).

In another aspect of the invention there is provided an exterior rear view mirror assembly for a motor vehicle including:
  a first reflective surface for providing a rearward field of view to a driver of the vehicle;
  a second reflective surface for providing a rearward field of view to the driver of an object located in a blind zone of the vehicle;
  a transition surface between the first reflective surface and the second reflective surface; said transition surface oriented generally towards the driver of the vehicle; and
  a blind spot indicator adapted to illuminate at least a portion of the transition surface when an object appears in the vehicle's blind zone so as to visually alert the driver of the vehicle to the presence of the object.

BRIEF DESCRIPTION OF THE DRAWINGS

Preferred embodiments of the invention are illustrated in the accompanying representations in which.

In the following description, like reference characters designate like or corresponding parts throughout the several views of the drawings.

DETAILED DESCRIPTION OF THE PREFERRED EMBODIMENT(S)

Figure 1:
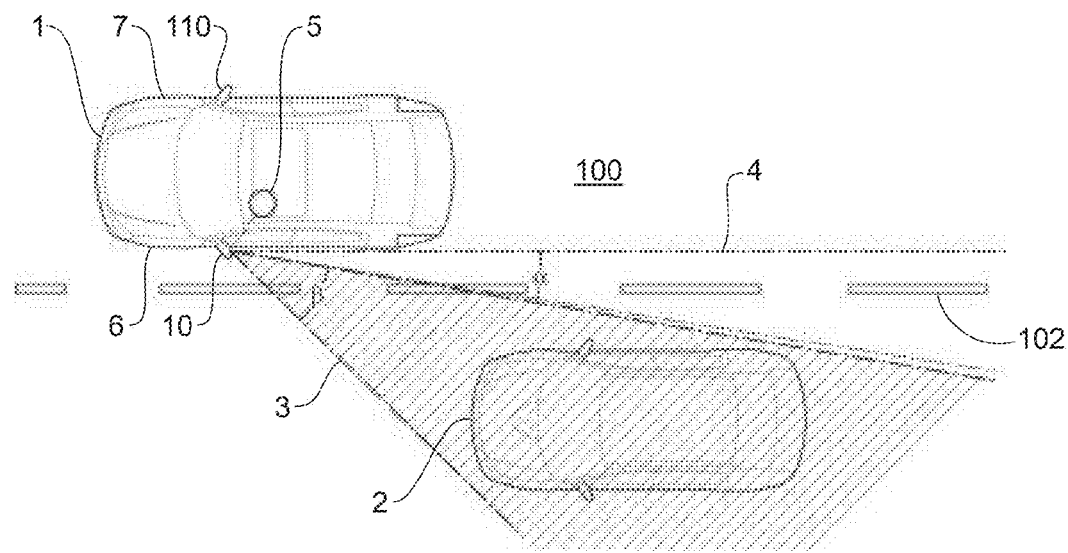
FIG. 1 is a plan view of a motor vehicle illustrating an object in the vehicle's blind zone.

Referring now to FIG. 1, there is shown a plan view of a motor vehicle 1 driving along a road 100 that has a dashed line 102 designating a boundary of a lane of the road 100. The motor vehicle 1 has external rear view mirror (side mirror) assemblies 10 and 110 that extend outwards from lateral sides 6, 7 of the vehicle 1 respectively. The rear view mirror assembly 10 is located on the left hand side 6 of the vehicle 1 and is closest to a driver 5 of the vehicle 1. The rear view mirror assembly 10 is used by the driver 5 to view the road and any objects therein to the rear of the vehicle 1. The following description will focus on the rear view mirror assembly 10 that is on the driver side 6 of the vehicle 1. It will be appreciated by those skilled in the art that the following discussion with regard to the driver side rear view mirror assembly 10 applies equally to the passenger side rear view mirror assembly 110. In some countries, the driver 5 is located on the right hand side of the vehicle, such that rear view mirror assembly 110 will be the driver's side mirror assembly.

Also shown in FIG. 1 is the field of view 4 of a conventional flat or slightly convex mirror surface. The field of view 4 of this mirror surface generally includes an angle α from the horizontal line extending along the lateral side 6 of the vehicle 1. This is the field of view that the driver 5 has when looking into the mirror assembly 10. Disposed adjacent the field of view 4 that is visible to the driver 5 is what is commonly referred to as a blind spot (or zone) 3 that extends generally through an angle β (this angle is shown diagrammatically only). The driver 5 cannot see what is in the blind spot 3, shown crosshatched in FIG. 1 without turning their head in that direction. An object 2 (for example a second motor vehicle) that is in the blind zone 3 of the vehicle 1 is a potential danger to the driver 5 as a collision may occur when performing an overtaking maneuver.

Figure 2:
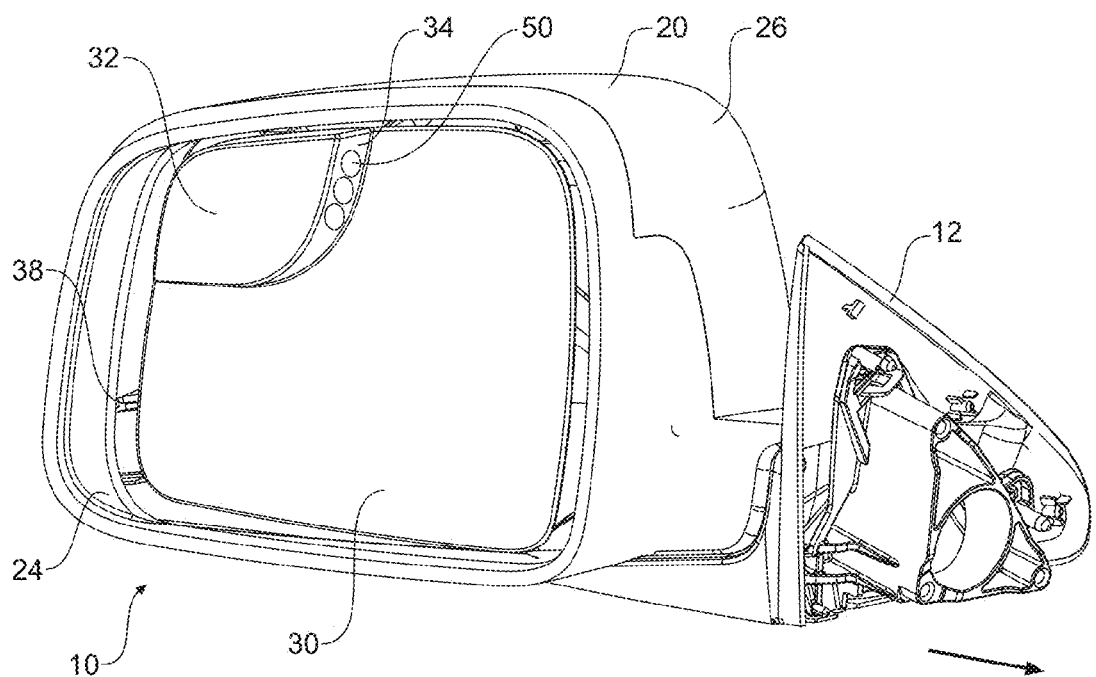
FIG. 2 is a perspective view of an external rear view mirror assembly with a blind spot indicator according to an embodiment of the invention.

The exterior rear view mirror assembly 10 according to a first embodiment of the invention is shown in FIG. 2. The exterior rear view mirror assembly 10 includes a mounting bracket 12 that secures the exterior rear view mirror assembly 10 to the lateral side 6 of the motor vehicle 1. A mirror case or housing 20 is secured to the mounting bracket 12. The mirror housing 20 defines an opening 24 that faces rearward with respect to the forward motion of the motor vehicle 1. A first mirror surface (conventional mirror surface) 30 and a second mirror surface (blind spot (spotter) mirror surface) 32 are visible through the opening 24. In a preferred embodiment, the spotter mirror surface 32 is located in an outboard portion of the mirror assembly 10 and preferably in the uppermost corner. It will be appreciated that the spotter mirror surface 32 may also be located in other portions of the mirror assembly 10 such as any corner region. The conventional mirror surface 30 and the spotter mirror surface 32 may be integrally formed so as to create a mirror of unitary construction. The integrated spotter and conventional mirror elements may be mounted to a backing plate 38 shown in FIGS. 2 and 5.

The mirror substrate (i.e. the base component that forms the mirror structure) is preferably formed from a suitable plastic polymer material that may be molded into a desired form. Preferably, the mirror is plastic injection moulded using a transparent plastic with a light transmission greater than 50% such as polycarbonate (PC) or acrylic (PMMA). A plastic mirror has much freedom of 3-dimensional form compared to a standard glass mirror. The ability to form the plastic into a desired form easily enables the integration of a spotter mirror with a conventional flat or slightly convex mirror.

Figure 5:
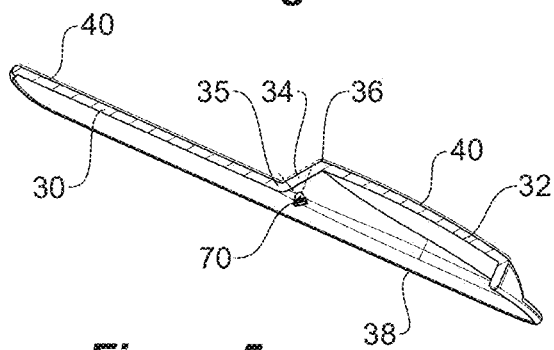
FIG. 5 is a sectional view through A-A of FIG. 4 illustrating the profile of the mirror assembly.
Figure 6:
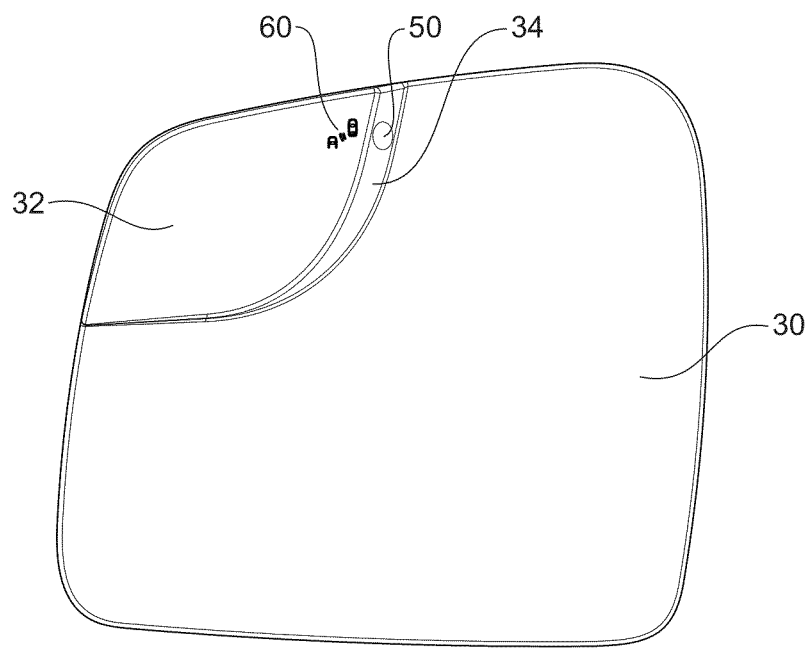
FIG. 6 is a front view of an external rear view mirror assembly according to a further embodiment of the invention.
Figure 7:
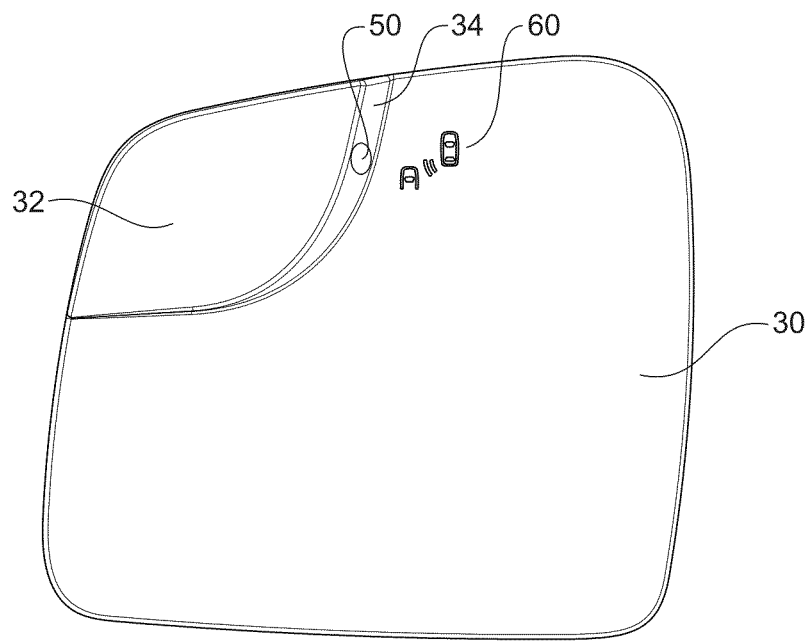
FIG. 7 is a front view of an external rear view mirror assembly according to a further embodiment of the invention.

After the plastic component (substrate) has been molded into the desired form, a reflective coating 40 is applied to either the front or back surface of the substrate to enable the plastic component to function as a mirror surface (see FIG. 5). The coating may be a metallic coating such as aluminium, chromium or silver for example. Any suitable process may be used to apply the coating including a vapour deposition process whereby a vacuum metalized layer is applied to the substrate. A hard coat may also be applied to protect the reflective surface. Alternative technologies such as in-mold film may also be used to apply the coating.

In a preferred form, the mirror assembly 10 provides a conventional mirror surface 30 that is flat or slightly convex for providing a driver of the vehicle with a rearward field of view 4 through angle α. The radius of curvature of the conventional mirror surface 30 is governed by international regulations. In some countries the radius of curvature may be a minimum of 600 mm, although typically it is around 1200 mm. The mirror assembly 10 also provides an integrated spotter (blind spot) mirror surface 32 for providing the driver with a rearward field of view 3 extending through angle β (i.e. encompassing the blind zone of the vehicle 1). In this manner, the field of view 3 of the spotter mirror surface 32 enables the driver to view objects that are not generally observable in the field of view 4 provided by the conventional mirror surface 30. Objects that appear in the vehicle's blind spot 3 which are not observable in the conventional mirror surface 30 will appear in the spotter mirror surface 32. In some embodiments the field of view of the spotter mirror surface 32 may overlap partially the field of view 4 provided by the conventional mirror surface 30. The radius of curvature of the spotter mirror surface 32 is typically 200-500 mm although this parameter is not typically governed by regulations. The radius of curvature of the spotter mirror surface 32 will typically be less than the radius of curvature of the conventional mirror surface 30 and therefore the spotter mirror surface 32 will provide a wider angle view than the conventional mirror surface 30. However, there may be embodiments where the spotter mirror surface 32 is flat (planar) or the radius of curvature of the spotter mirror surface 32 is the same as the radius of curvature of the conventional mirror surface 30.

Figure 11:
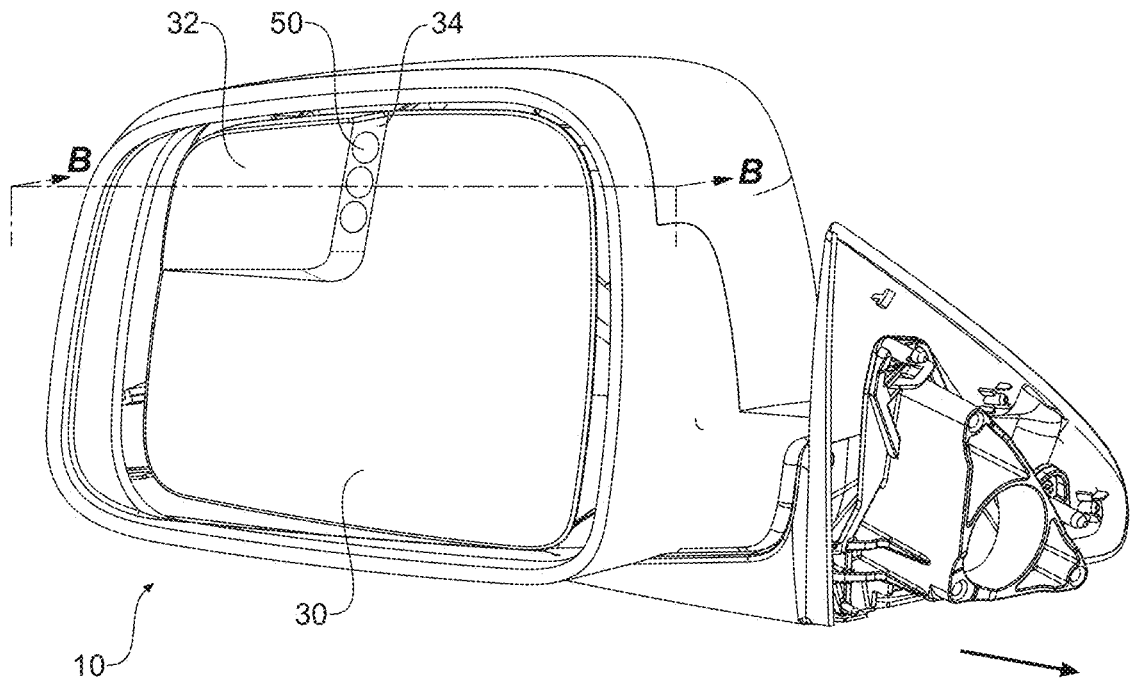
FIG. 11 is a perspective view of an external rear view mirror assembly having a flat spotter mirror surface according to a further embodiment of the invention.
Figure 12:
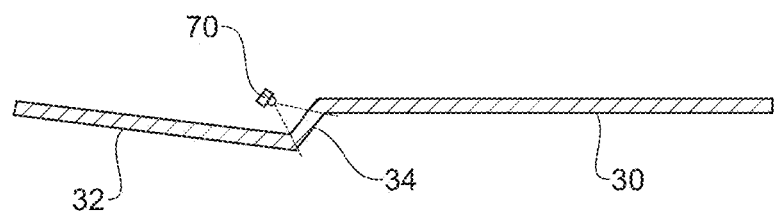
FIG. 12 is a sectional view through B-B of FIG. 11 illustrating the profile of the mirror assembly with the flat spotter mirror surface.

FIG. 11 illustrates a perspective view of an exterior rear view mirror assembly 10 which has a flat spotter mirror surface 32 and a flat conventional mirror surface 30. FIG. 12 shows a profile view of the embodiment shown in FIG. 11. When the spotter mirror surface 32 is flat, the spotter mirror 32 must point in a different direction to the conventional mirror surface 30 in order to obtain a wider angle view which includes the blind spot 3 of the vehicle 1. FIG. 12 illustrates the spotter mirror surface 32 angled relative to the conventional mirror surface 30 such that a more lateral viewing zone is achieved. Throughout this specification, a flat or planar mirror surface is taken to have zero curvature or an infinite radius of curvature. Hence, reference to the term "radius of curvature" is not restricted to a surface having a finite radius.

According to a preferred embodiment of the invention, a transition surface 34 is formed or disposed between the first and second mirror surfaces 30, 32. In other words, the transition surface 34 is formed between the spotter mirror surface 32 and the conventional mirror surface 30 thereby creating a separation (or offset) between the two distinct viewing surfaces. The transition surface or zone 34 forms a discrete step or discontinuity between the conventional mirror surface 30 and spotter mirror surface 32 as most clearly illustrated in the sectional view A-A shown in FIG. 5. The transition or step surface 34 has a first edge 35 contiguous with the conventional mirror surface 30 and a second edge 36 contiguous with the spotter mirror surface 32. The step surface 34 is oriented generally towards the driver 5 of the vehicle 1, or at least away from other road users. For this reason, the step surface 34 does not provide a useful field of view for the driver 5. As such, the step surface 34 is a largely redundant part of the mirror which forms a suitable area for symbols and/or indicators that are easily viewable by the driver 5. As such the step surface 34 that is disposed between the first 30 and second 32 mirror surfaces may be used to display a blind spot indicator to the driver 5 when an object 2 is detected in the vehicle's blind spot 3. An indicator in this region is advantageous as it does not impinge upon the driver's visible or useful field of view provided by the conventional mirror surface 30 or spotter mirror surface 32. The step surface 34 being oriented generally towards the driver is also advantageous as indicators displayed in this region will not generally be viewable or a distraction to other road users.

In U.S. Pat. No. 6,919,796, the conventional mirror surface and spotter mirror surfaces are not integrally formed and there is not a discrete step or transition surface between the respective mirrors. While the mirror assembly disclosed in US 2005/0174645 is of unitary construction, there is no separation or offset between the respective conventional and spotter mirror surfaces which leads to the drawbacks of placement of the blind spot indicator means as previously discussed.

Figure 10:
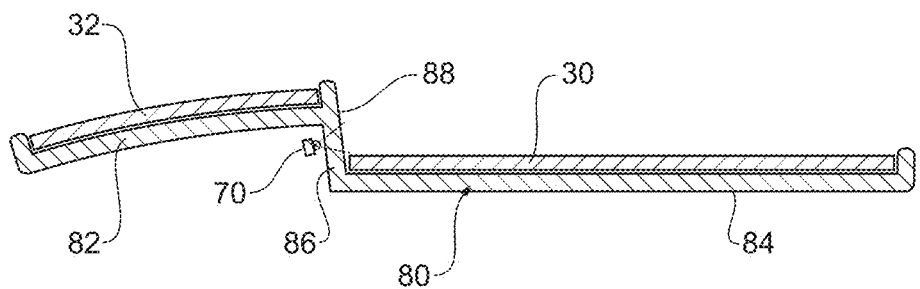
FIG. 10 is a diagrammatic sectional profile view of an external rear view mirror assembly of non-unitary construction according to a further embodiment of the invention.

In another embodiment of the invention, the mirror assembly 10 may not be integrally formed, as shown diagrammatically in FIG. 10. FIG. 10 shows a diagrammatic sectional profile of an embodiment of the mirror assembly whereby the conventional mirror surface 30 and spotter mirror surface 32 are formed on separate mirror elements which are secured to a mounting plate 80 that is designed to receive the respective mirror elements. The mounting detail is not shown in FIG. 10 but the mirror elements may simply clip onto the mounting plate 80. Examples of different mounting alternatives are shown in the applicant's earlier filed U.S. patent application Ser. Nos. 11/968,989 and 12/978,458 which are hereby incorporated by reference.

The mounting plate 80 shown in FIG. 10 is formed such that the spotter mirror receiving portion 82 is stepped apart from the conventional mirror receiving portion 84. The stepped portion 86 therefore creates an offset between the mirrors and is functionally equivalent to the step or transition surface 34 described in previous embodiments. The stepped portion 86 is generally oriented towards the driver 5 of the vehicle 1 and has a front surface 88 for providing symbols and/or indicators to alert the driver 5 to the presence of an object 2 in the vehicle's blind zone 3. The mounting plate 80 may be formed from any suitable plastic polymer material such as polycarbonate (PC) or acrylic (PMMA). A transparent plastic may be used with a light transmission greater than 50%.

Figure 8:
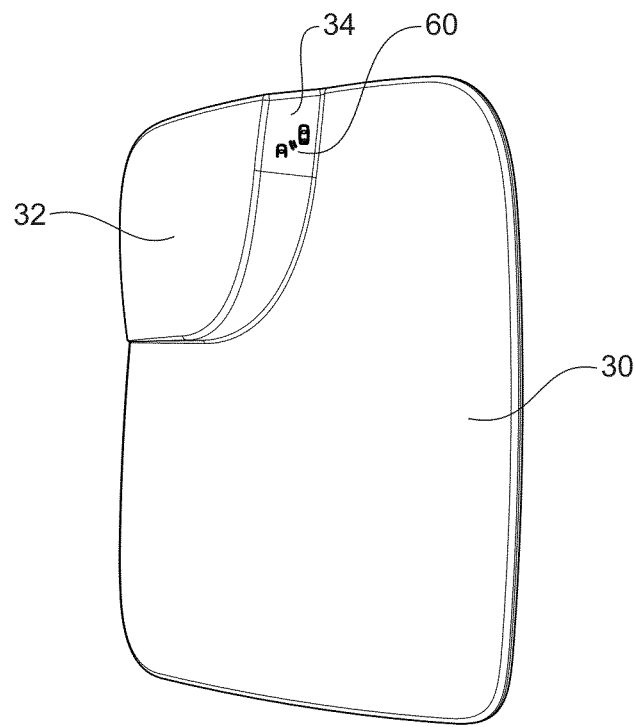
FIG. 8 is a perspective view of an external rear view mirror assembly according to a further embodiment of the invention.

A blind spot indicator may be displayed in several ways in accordance with the present invention as illustrated in FIGS. 3-9. A symbol 60, for example the ISO symbol of two vehicles in an overtaking position may be used to alert the driver 5 to the presence of an object 2 in the vehicle's blind zone 3 as shown in FIG. 8. The symbol 60 may be printed or laser etched onto the step surface 34 by removing a portion of the reflective coating 40. Alternatively, the area for the symbol may be masked prior to applying the reflective coating 40 to the substrate. A light source 70 located behind the mirror substrate may then illuminate the symbol 60 when an object 2 is detected in the vehicle's blind zone 3. The light may remain 'ON' or may be configured to intermittently flash so that the symbol 60 will in turn appear to flash to the driver 5. The light source 70 may be a light emitting diode (LED) that emits light of any suitable color (for example red or yellow). An LED mounted to the rear of the substrate immediately behind the step or transition surface 34 is shown most clearly in FIG. 5.

In another embodiment, the indicator may take the form of one or more small circles 50 (or any other shape) that is marked or laser etched onto the step surface 34 (see FIGS. 2, 6, 7 and 9 in particular). Again a light source 70 is provided behind the substrate that is adapted to illuminate when an object 2 is detected in the vehicle's blind zone 3. In this embodiment, the driver 5 will see the circles (or other markings) illuminated which will provide a visual alert. A symbol 60 such as the ISO overtaking symbol may be provided in close proximity to the circles (or other markings) to identify the feature as being a blind spot indicator. The identifying symbol (e.g. ISO symbol) may or may not itself be illuminated in this embodiment).

The indicator may not necessarily be marked or laser etched onto the step surface 34. In one embodiment, the step or transition surface 34 has a semi-transparent coating such that the indicator may be the light source 70 (e.g. LED) itself. If the step surface 34 is semi-transparent then some light will be transmitted through the surface such that the one or more LEDs will become visible when illuminated. While not illuminated, the indicator would not generally be observable by the driver.

Figure 9:
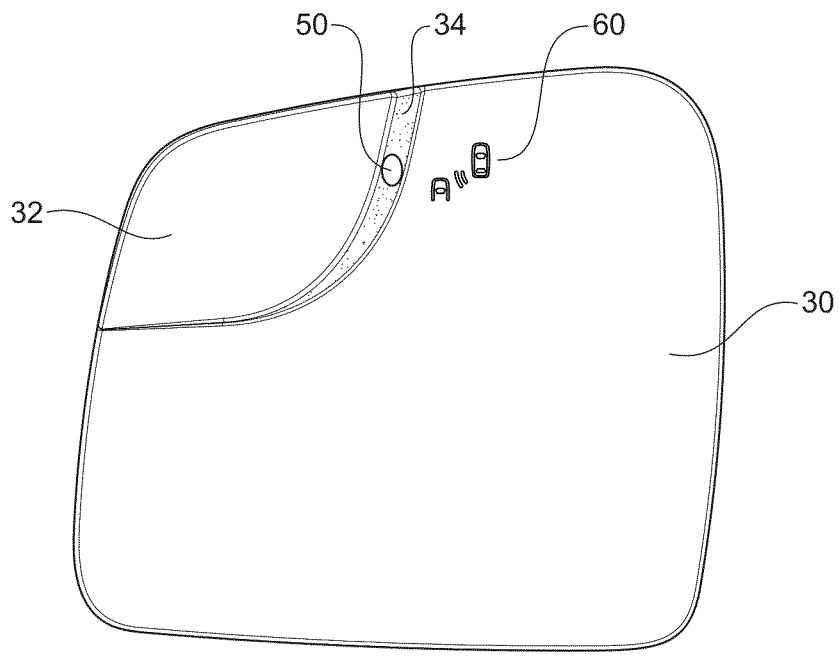
FIG. 9 is a front view of an external rear view mirror assembly according to a further embodiment of the invention.

The step or transition surface 34 may also be textured to create diffuse reflection (and transmission) instead of specular reflection (see FIG. 9). This will highlight the different viewing surfaces of the mirror assembly thereby further delineating between the conventional mirror surface 30 and the spotter mirror surface 32. The texturing may be created by rough polishing the step surface 34. A light source 70 illuminated behind the substrate would be transmitted diffusely through the step surface 34 which would cause the whole surface to be at least partially illuminated. Other alternatives are also possible, for example specific areas of light transmission may not be textured such that viewability of the indicator by parties other than the driver 5 is minimized.

Features such as a light guide or similar device (not shown) to direct light from the light source 70 may be used to further direct the light towards the driver 5 of the vehicle 1. Although it will be understood from the embodiments described that having a symbol or indicator on the step surface 34 will substantially direct light towards the driver 5 of the vehicle 1 (by virtue of the orientation of the step surface 34), a light guide would further direct the light transmission. This is advantageous as the distraction to other road users is reduced by directing the light in this way. The light distribution may be further improved by using optical features moulded into the mirror as described in the Applicant's European Patent Application No. EP 11152485, the contents of which are hereby incorporated by reference.

Figure 3:
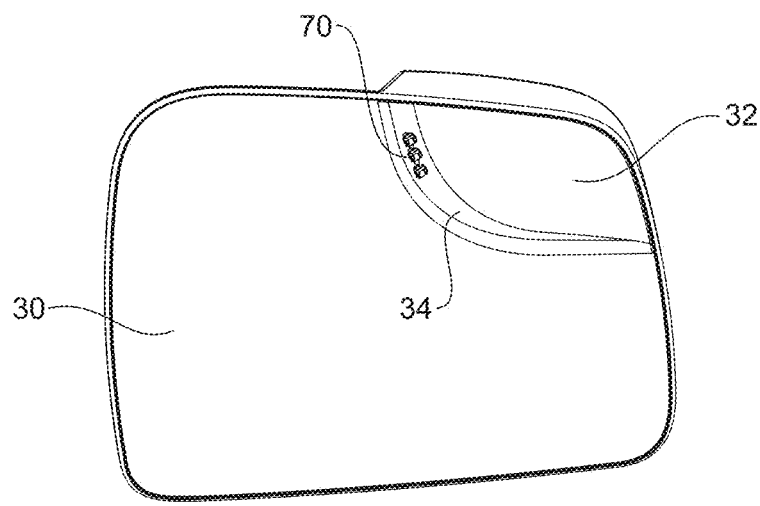
FIG. 3 is rear perspective view of the mirror as shown in FIG. 2.
Figure 4:
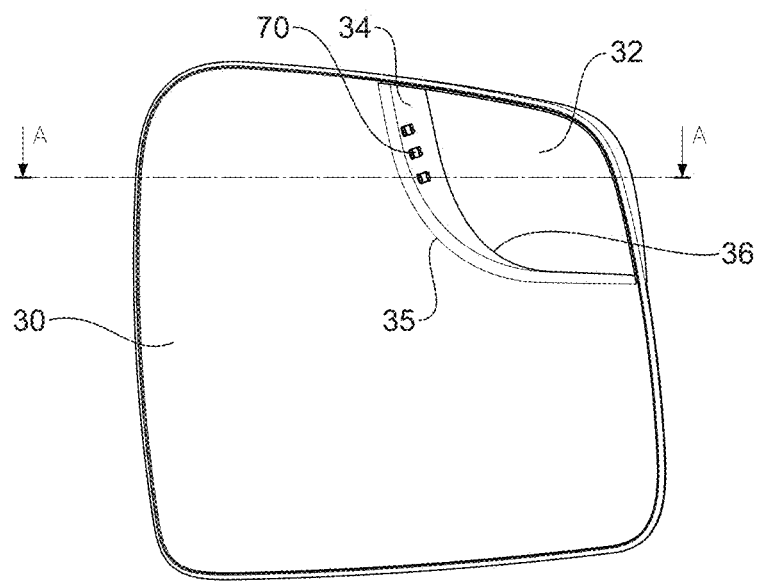
FIG. 4 is a rear view of the mirror as shown in FIG. 2.

In all of the embodiments described herein, there may be more than one light source (such as shown in FIGS. 2-4). For example, the indicator may comprise multiple LEDs, all adapted to illuminate at least a portion of the step or transition surface 34. For example, there may be one, two or three LEDs which are illuminated when an object 2 appears in the vehicle's blind zone 3. In addition to the visual alert provided by the indicator, there may also be an audio alert such as a repetitive tone.

Detection of the object 2 in the blind zone 3 of the vehicle 1 can be enabled by various means. Object detection may be carried out as is common in the art, for example using a sensor that transmits a signal into the blind zone and receives back a reflected signal if an object is present. The sensor may be infrared, optical, radar, sonar or ultrasonic. When the sensor detects an object, a signal is sent to a vehicle communication system which processes the signal and activates the blind spot indicator. While the detector may be located in a number of alternative positions, it is typically mounted in the rear bumper of the vehicle, rather than in the mirror housing. With preferred embodiments of the invention, the detector is not located within either of the external rear vision mirror assemblies 10, 110.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The claims defining the invention are as follows:

1. An exterior rear view mirror assembly for a motor vehicle, the exterior rear view mirror assembly comprising:
   a first mirror surface for providing a rearward field of view to a driver of the motor vehicle;
   a second mirror surface for providing a rearward field of view to the driver of a blind spot of the motor vehicle;
   a transition surface disposed between the first and second mirror surfaces and oriented toward the driver of the motor vehicle; and
   a blind spot indicator fixedly secured to said transition surface and oriented toward the driver of the motor vehicle to provide indication to the driver when an object is detected in the blind spot of the motor vehicle by said blind spot indicator emitting light toward the driver of the motor vehicle.

2. The exterior rear view mirror assembly according to claim 1 wherein the transition surface has a first edge contiguous with the first mirror surface and a second edge contiguous with the second mirror surface.

3. The exterior rear view mirror assembly according to claim 1 wherein the first mirror surface, second mirror surface and transition surface are integrally formed.

4. The exterior rear view mirror assembly according to claim 1 wherein the transition surface forms a discrete step or discontinuity between the first and second mirror surfaces.

5. The exterior rear view mirror assembly according to claim 1 wherein at least a portion of the transition surface is transparent.

6. The exterior rear view mirror assembly according to claim 1 wherein at least a portion of the transition surface is semi-transparent.

7. The exterior rear view mirror assembly according to claim 1 wherein the blind spot indicator includes a light source located behind the transition surface.

8. The exterior rear view mirror assembly according to claim 7 wherein the light source includes at least one light emitting diode (LED).

9. The exterior rear view mirror assembly according to claim 8 wherein the blind spot indicator includes an indicator displayable on the transition surface, the indicator illuminated by the light source when an object is detected in the blind spot of the motor vehicle.

10. The exterior rear view mirror assembly according to claim 9 further including a symbol located on either the first or second mirror surfaces for identifying the indicator displayable on the transition surface as a blind spot indicator.

11. The exterior rear view mirror assembly according to claim 1 wherein the first mirror surface has a minimum radius of curvature of 600 mm.

12. The exterior rear view mirror assembly according to claim 1 wherein the second mirror surface has a radius of curvature in the range 200-500 mm.

13. The exterior rear view mirror assembly according to claim 1 wherein at least one of the first or second mirror surfaces are flat.

14. The exterior rear view mirror assembly according to claim 1 wherein the first mirror, the second mirror and the transition surface are formed from a plastic polymer.

15. The exterior rear view mirror assembly according to claim 14 wherein the plastic polymer is formed from a polycarbonate or acrylic material.

\* \* \* \* \*